United States Patent
Piper et al.

(10) Patent No.: US 9,053,541 B2
(45) Date of Patent: Jun. 9, 2015

(54) IMAGE REGISTRATION

(75) Inventors: Jim Piper, Edinburgh (GB); Sean Murphy, Edinburgh (GB); Ian Poole, Edinburgh (GB); Jian Song, Shanghai (CN)

(73) Assignees: KABUSHIKI KAISHA TOSHIBA, Tokyo (JP); TOSHIBA MEDICAL SYSTEMS CORPORATION, Otawara-shi (JP)

( * ) Notice: Subject to any disclaimer, the term of this patent is extended or adjusted under 35 U.S.C. 154(b) by 258 days.

(21) Appl. No.: 13/544,192

(22) Filed: Jul. 9, 2012

(65) Prior Publication Data
US 2014/0010422 A1    Jan. 9, 2014

(51) Int. Cl.
G06K 9/00    (2006.01)
G06T 7/00    (2006.01)

(52) U.S. Cl.
CPC ..... *G06T 7/0028* (2013.01); *G06T 2207/30004* (2013.01)

(58) Field of Classification Search
USPC ................. 382/100, 128–132, 154, 285, 294; 128/922; 378/4–27; 345/419–427, 345/660–671; 348/578–580, 561, 581, 582, 348/704; 708/208
See application file for complete search history.

(56) References Cited

U.S. PATENT DOCUMENTS

| | | | | |
|---|---|---|---|---|
| 5,690,106 | A * | 11/1997 | Bani-Hashemi et al. | 600/425 |
| 6,266,453 | B1 * | 7/2001 | Hibbard et al. | 382/294 |
| 7,177,486 | B2 * | 2/2007 | Stewart et al. | 382/294 |
| 7,340,082 | B2 * | 3/2008 | Janssen et al. | 382/128 |
| 8,345,943 | B2 * | 1/2013 | Neemuchwala et al. | 382/130 |
| 8,553,961 | B2 * | 10/2013 | Zhu et al. | 382/131 |
| 8,588,501 | B2 * | 11/2013 | Miao et al. | 382/132 |
| 2007/0014465 | A1 * | 1/2007 | Numata et al. | 382/131 |
| 2010/0260392 | A1 * | 10/2010 | Wiemker et al. | 382/128 |
| 2011/0019889 | A1 * | 1/2011 | Gering et al. | 382/131 |
| 2013/0163896 | A1 * | 6/2013 | Chen et al. | 382/278 |

OTHER PUBLICATIONS

Xia Li, et al., "Automatic Inter-subject Registration of Whole Body Images", Biomedical Image Registration, 2006, pp. 18-25.
Xia Li, et al., "Automatic Registration of whole body serial micro CT images with a combination of point-based and intensity-based registration techniques", Biomedical Imaging: Nano to Macro, $3^{rd}$ IEEE International Symposium, 2006, pp. 454-457.

(Continued)

*Primary Examiner* — Anand Bhatnagar
(74) *Attorney, Agent, or Firm* — Oblon, McClelland, Maier & Neustadt, L.L.P.

(57) ABSTRACT

Certain embodiments provide a computer system operable to determine a registration mapping between a first medical image and a second medical image, the computer system comprising: a storage device for storing data representing the first medical image and the second medical image; and a processor unit operable to execute machine readable instructions to: (a) identify a plurality of elements in the first medical image; (b) determine a spatial mapping from each element in the first medical image to a corresponding element in the second medical image to provide a plurality of spatial mappings subject to a consistency constraint; and (c) determine a registration mapping between the first medical image and the second medical image based on the plurality of spatial mappings from the respective elements of the first medical image to the corresponding elements of the second medical image.

25 Claims, 10 Drawing Sheets

(56) References Cited

OTHER PUBLICATIONS

Miguel A. Martin-Fernandez, et al., "Articulated registration: elastic registration based on a wire-model", Proc. of SPIE, vol. 5747, 2005, pp. 182-191.
J. A. Little, et al., "Deformations Incorporating Rigid Structures", Mathematical Methods in Biomedical Image Analysis, Proceedings of the Workshop, Jun. 21-22, 1996, pp. 104-113.
Alain Pitiot, et al., "Piecewise affine registration of biological images for volume reconstruction", Medical Image Analysis, 2005, 19 pages.
Vivek Walimbe, et al., "Elastic registration of three-dimensional whole body CT and PET images by quaternion-based interpolation of multiple piecewise linear rigid-body registrations" Proceedings of SPIE, vol. 5370, 2004, pp. 119-128.
Raj Shekhar, et al., "Automated 3-Dimensional Elastic Registration of Whole-Body PET and CT from Separate or Combined Scanners", The Journal of Nuclear Medicine, vol. 46, No. 9, Sep. 2005, pp. 1488-1496.
Xiahai Zhuang, et al., "A Registration-Based Propagation Framework for Automatic Whole Heart Segmentation of Cardiac MRI", IEEE Transactions on Medical Imaging, vol. 29, No. 9, Sep. 2010, pp. 1612-1625.
Vincent Arsigny, et al., "Polyrigid and Polyaffine Transformations: A New Class of Diffeomorphisms for Locally Rigid or Affine Registration", Medical Image Computing and Computer-Assisted Intervention-MICCAI 2003, pp. 829-837.
Jean-Michel Rouet, et al., "Genetic Algorithms for a Robust 3-D MR-CT Registration", IEEE Transactions on Information Technology in Biomedicine, vol. 4, No. 2, 2000 pp. 126-136.
Venkat R. Mandava, et al., "Adaptive Search Space Scaling in Digital Image Registration", IEEE Transaction on Medical Imaging, vol. 8, No. 3, Sep. 1989, pp. 251-262.
J. C. Gower, et al., "Minimum Spanning Trees and Single Linkage Cluster Analysis", Journal of Royal Statistical Society, Series C (Applied Statistics), vol. 18, No. 1, 1969, pp. 54-64.
Hirotugu Akaike, "A New Look at the Statistical Model Identification", IEEE Transactions on Automatic Control, vol. AC-19, No. 6, Dec. 1974, pp. 716-723.
John Ashburner, et al., "Rigid Body Registration", (Human brain function), Chapter 2, 2003, 24 pages.
Carl Bergstrom, "Lecture 3: Joint entropy, conditional entropy, relative entropy, and mutual information", Biology 429, Jan. 13, 2008, 8 pages.
Yen-Wei Chen, et al., "Hybrid Particle Swarm Optimization for Medical Image Registration", Fifth International Conference on Natural Computation, 2009, pp. 26-30.
Sheung Hun Cheng, et al., "Approximating the logarithm of a matrix to specified accuracy", SIAM Journal on Matrix Analysis and Applications, vol. 22, No. 4, 2001, pp. 1112-1125.
Arlene A. Cole-Rhodes, et al., "Multiresolution Registration of Remote Sensing Imagery by Optimization of Mutual Information Using a Stochastic Gradient", IEEE Transactions on Image Processing, vol. 12, No. 12, 2003, pp. 1495-1511.
T.F. Cootes, et al., "A Unified Framework for Atlas Matching using Active Appearance Models", Information Processing in Medical imaging, (Springer), 1999, 13 pages.
W. R. Crum, et al., "Non-Rigid image registration: theory and practice", British Journal of Radiology 77, (Special issue),2004, pp. S140-S153.
Russell Eberhart, et al., "A New Optimizer Using Particle Swarm Theory", Micro Machine and Human Science, Proceedings of the Sixth International Symposium, 1995, pp. 39-43.

Matthieu Ferrant, et al., "Surface Based Atlas Matching of the Brain Using Deformable Surfaces and Volumetric Finite Elements", Medical Image Computing and Computer-Assisted Intervention-MICCAI 2001, 2010, 2 pages.
A. Ardeshir Goshtasby, "2-D and 3-D Image Registration for Medical, Remote Sensing, and Industrial Applications", Wiley-Interscience, 2005, 280 pages.
Joseph V. Hajnal, et al., "Medical Image Registration", Biomedical Engineering Series, CRC Press, 2001, 9 pages.
Mark Holden, "A Review of Geometric Transformations for Non-rigid Body Registration", IEEE Transactions on Medical Imaging, vol. 27, No. 1, 2008, pp. 111-128.
U. Z. Ijaz, et al., "Rapid Hybrid Ultrasound volume registration", (University of Cambridge), CUED/F-INFENG/TR 644, Mar. 2010, 15 pages.
A. K. Jain, et al., "Data Clustering: A Review", ACM Computing Surveys, vol. 3, No. 3, Sep. 1999, pp. 264-323.
Stefan Klein, et al., "Evaluation of Optimization Methods for Non-rigid Medical Image Registration Using Mutual Information and B-Splines", IEEE Transactions on Image Processing, vol. 16, No. 12, Dec. 2007, pp. 2879-2890.
Philip A. Legg, et al., "A robust solution to multi-modal image registration by combining Mutual Information with multi-scale derivatives", Medical Image Computing and Computer-Assisted Intervention-MICCAI, 2009, 8 pages.
Lukasz A. Machowski, et al., "Evolutionary Optimisation Methods for Template Based Image Registration", Arxiv preprint arXiv:0705.1674, 2007, 6 pages.
J. B. Antoine Maintz, et al., "A survey of medical image registration", Medical image analysis, vol. 2, No. 1, 1998, 36 pages.
Christopher D. Manning, et al., "An Introduction to Information Retrieval", vol. 1, Cambridge University Press, 2008, 581 pages.
Xenophon Papademetris, et al., "Articulated Rigid Registration for Serial Lower-Limb Mouse Imaging", Medical Image Computing and Computer-Assisted Intervention-MICCAI, 2005, pp. 919-926.
Josien P. W. Pluim, et al., "Image registration by maximization of combined mutual information and gradient information", IEEE Transactions on Medical Imaging, (19) 8, 2000, 6 pages.
Josien P. W. Pluim, et al., "Mutual-Information-Based Registration of Medical Images: A Survey," IEEE Transactions on Medical Imaging, vol. 22 No. 8, 2003, pp. 986-1004.
Vaclav Potesil, et al., "Improved Anatomical Landmark Localization in Medical Images Using Dense Matching of Graphical Models", British Machine Vision Conference, 2010, 10 pages.
Alexis Roche, et al., "The Correlation Ration as a New Similarity Measure for Multimodal Image Registration", MICCAI, vol. 1496 of LNCS, 1998, pp. 1115-1124.
D. Rueckert, et al., "Nonrigid Registration Using Free-Form Deformations: Application to Breast MR Images", IEEE Transactions on Medical Imaging, vol. 18, No. 8, Aug. 1999, pp. 712-721.
Yuhui Shi, et al., "A Modified Particle Swarm Optimizer", IEEE World Congress on Computational Intelligence, 1998, pp. 69-73.
Richard Szeliski, "Image Alignment and Stitching: A Tutorial", Foundations and Trends in Computer Graphics and Vision, vol. 2, No. 1, 2006, pp. 1-104.
H. Talbi, et al., "Particle Swam Optimization for Image Registration", Information and Communication Technologies, (Theory to Applications), 2004, pp. 397-398.
Petra A. van den Elsen, et al., "Medical Image Matching—A Review with Classification", IEEE Engineering in Medicine and Biology, 1993, pp. 26-39.
Haonan Wang, "Measures of Agreement for Rotation Matrices with Application to Vectorcardiography Data", Technical Report, 2008, 28 pages.
Barbara Zitova, et al., "Image registration methods: a survey", Image and Vision Computing 21, (Elsevier), 2003, 24 pages.

\* cited by examiner

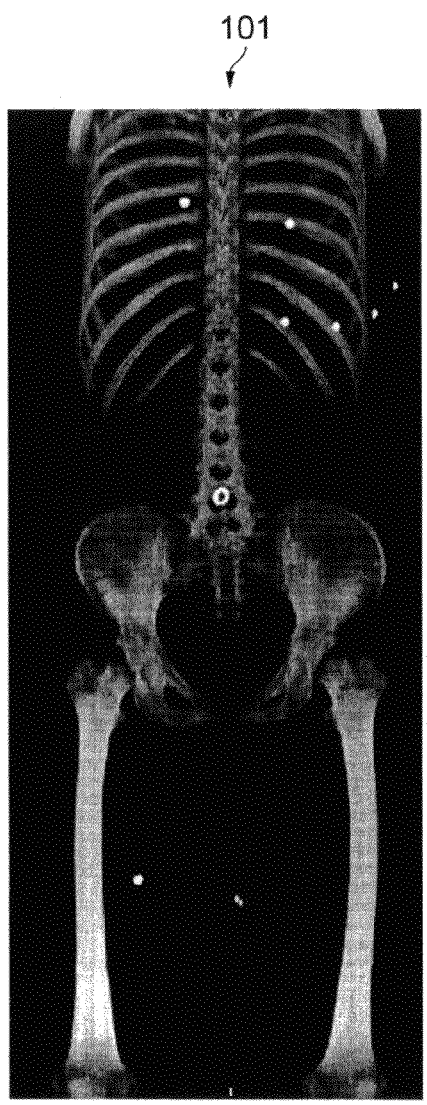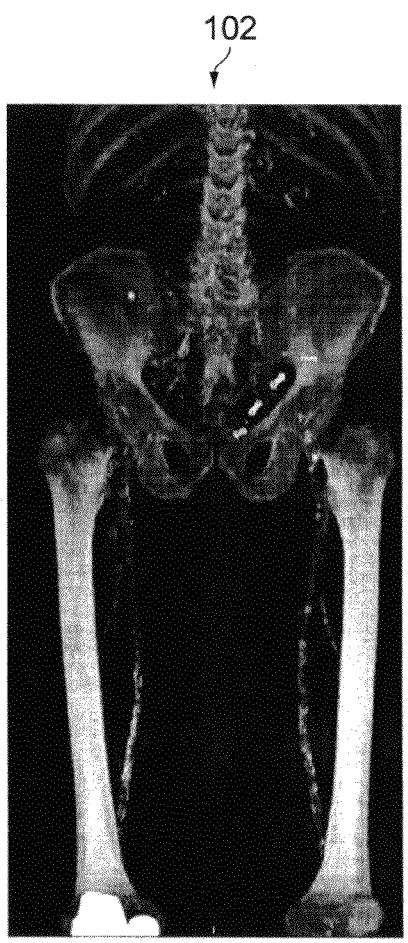
FIG. 5A
FIG. 5B

IMAGE REGISTRATION

BACKGROUND OF THE INVENTION

Embodiments described herein generally relate to the registration of images, and in particular to the registration of images derived from medical image data.

In the medical field, two-dimensional (2D) and three-dimensional (3D) image data sets are collected by a variety of techniques—referred to as modalities in the field—including conventional X-ray, computer-assisted tomography (CT), magnetic resonance (MR), ultrasound and positron-emission-tomography (PET). Examples of 2D images include not only conventional X-ray images, but also 2D images derived from 3D image data sets, i.e. volume data sets, such as a "slice" of a CT scan or a "slab" of volume data from a CT scan in a multi-planar reformatting (MPR) view. Time resolved 3D studies are also well known and are usually referred to as 4D studies, with time being the fourth "dimension". For example, time-resolved perfusion in abdominal organs is measured using 4D dynamic contrast enhanced CT (DCE-CT). It is also known to co-present images of the same patient taken with different modalities, such as combining CT and PET scans into a single image. These combined representations are sometimes referred to as 5D studies.

A common task when analyzing medical image data is a desire to compare one image with another, for example, to compare a patient image from one time with a corresponding image of the patient from another time or other reference image. In order to compare first and second medical images it can be useful to spatially transform one of the images to attempt to align corresponding body parts from the two images. This process is known as image registration. Image registration may be performed with a view to displaying the registered image to a user for direct visual inspection or to assist automated processing techniques, such as automated image segmentation.

In some situations registration might be applied for relatively small images of a specific body part, for example to compare an image of a patient's heart with another heart image. In other cases, registration might be applied on a larger scale, for example for registering images of relatively large parts of a body, such as a thorax. Large-scale image registration may sometimes be referred to as "whole-body" registration. This term may be used generally for large-scale image registration, for example in the context of medical images containing several different anatomical features, and should not be interpreted as necessarily requiring an entire complete body image from head to toe. In some cases, two images which are to be compared may not have the same extent. For example, in some situations there may be a desire to register a relatively small study image against a larger reference image (for example, a whole-body atlas image)

Large-scale medical image registration, for example of whole-body images, can be more difficult to perform successfully than smaller-scale medical image registration. This can be due to the wide variations in the appearance and relative locations and orientations of anatomical features between different patients, and also differences in patient position/orientations when comparing images from the same patient.

Accordingly, there are a need to provide improved schemes for medical image registration, and in particular in the context of medical image registration involving relatively large-scale medical images.

BRIEF DESCRIPTION OF THE DRAWINGS

Embodiments of the invention are now described by way of example only with reference to the following drawings.

FIGS. 5A and 5B schematically shows a reference image and a study image for use in a registration process according to an embodiment of the invention.

DETAILED DESCRIPTION

Figure 1:
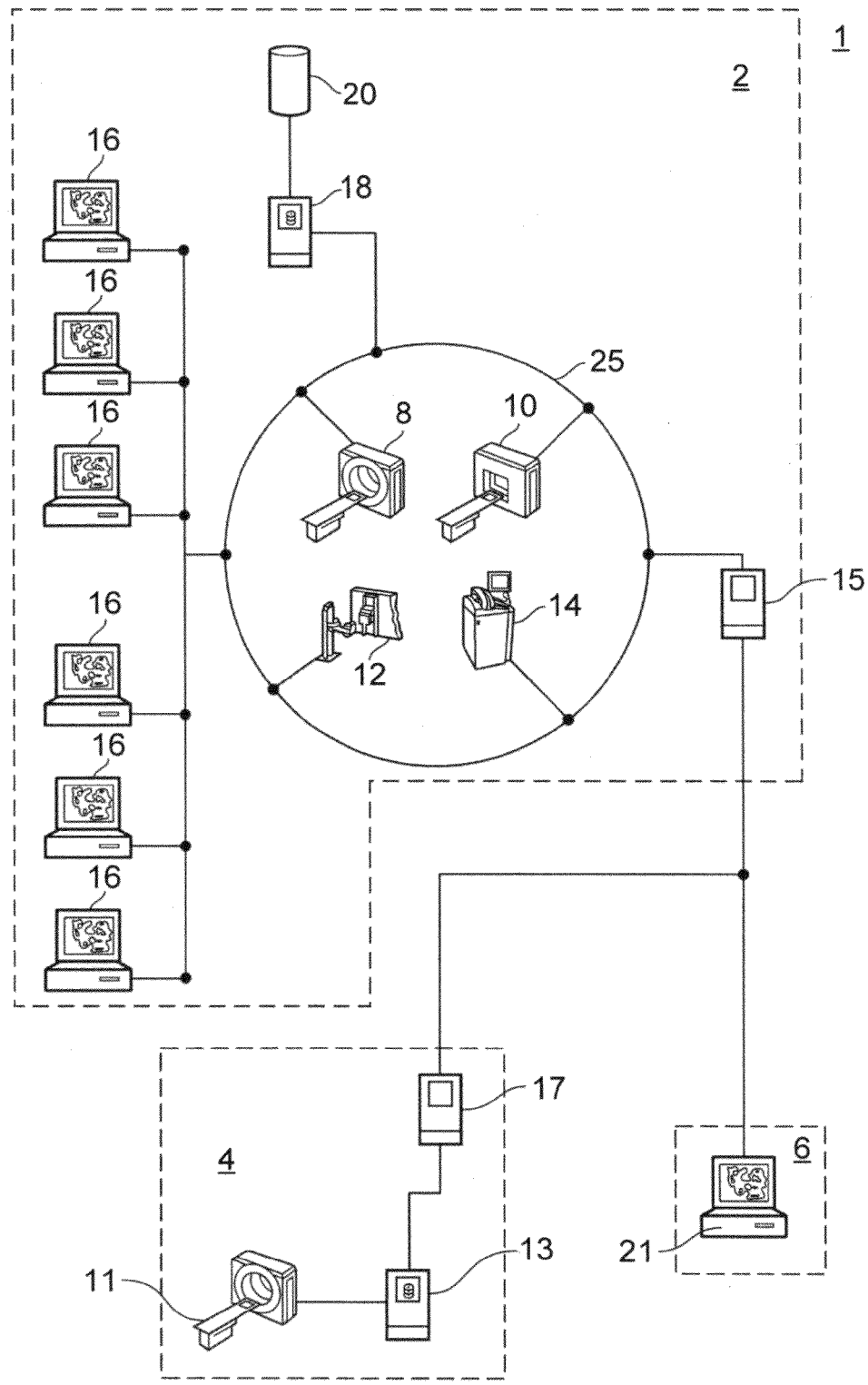
FIG. 1 is a schematic diagram showing an exemplary network of diagnostic devices and associated equipment.

Certain embodiments of the invention provide a computer system operable to determine a registration mapping between a first medical image (for example, a "reference" image) and a second medical image (for example, a "novel"/"study" image), the computer system comprising: a storage device for storing data representing the first medical image and the second medical image and a processor unit operable to execute machine readable instructions to: (a) identify a plurality of elements in the first medical image; (b) determine a spatial mapping from each element in the first medical image to a corresponding element in the second medical image to provide a plurality of spatial mappings subject to a consistency constraint; and (c) determine a registration mapping between the first medical image and the second medical image based on the plurality of spatial mappings from the respective elements of the first medical image to the corresponding elements of the second medical image.

Certain embodiments of the invention provide a computer-implemented method for determining a registration mapping between a first medical image and a second medical image, the method comprising the steps of: (a) identifying a plurality of elements in the first medical image; (b) determining a spatial mapping from each element in the first medical image to a corresponding element in the second medical image to provide a plurality of spatial mappings, wherein the spatial mappings are subject to a consistency constraint; and (c) determining a registration mapping between the first medical image and the second medical image based on the plurality of spatial mappings from the respective elements of the first medical image to the corresponding elements of the second medical image.

Methods in accordance with certain embodiments of the invention comprise providing an output data set representing the registration mapping. The output data may be used to display aspects of the first and/or second medical images on a visual display in a manner that takes account of the registration mapping, for example to show a correspondence between elements of the first and second medical images. Also the output data may be used in subsequent automated processing of the first and/or second medical images in a manner that takes account of the registration mapping, for example to aid in transferring segmentation information (e.g. masks) associated with one medical image to the other.

In accordance with certain embodiments the consistency constraint is applied by identifying inconsistent spatial mappings which are outside a set of the plurality of spatial mappings which meet a self-consistency criterion and modifying the inconsistent spatial mappings for improved consistency with spatial mappings which meet the self-consistency criterion.

In accordance with certain embodiments modifying an inconsistent spatial mapping comprises replacing the inconsistent spatial mappings with a replacement spatial mapping determined from spatial mappings which meet the self-consistency criterion.

In accordance with certain embodiments the replacement spatial mapping is based on an average of the spatial mappings which meet the self-consistency criterion.

In accordance with certain embodiments the processor unit is operable such that a parameter derived from each transformation matrix representing the respective spatial mappings is used in determining which spatial mappings meet the self-consistency criterion.

In accordance with certain embodiments the processor unit is operable such that a parameter derived from respective pairs of transformation matrices representing the respective spatial mappings is used in determining which spatial mappings meet the self-consistency criterion.

In accordance with certain embodiments the processor unit is operable such that the spatial mappings which meet the self-consistency criterion are determined based on a cluster analysis for the spatial mappings.

In accordance with certain embodiments the cluster analysis is based on deriving a similarity measure between respective pairs of spatial mappings.

In accordance with certain embodiments the similarity measure is based on a logarithm function applied to matrices representing the spatial mappings of the respective pairs of spatial mappings.

In accordance with certain embodiments the logarithm function comprises determining the logarithm of a product of a first matrix representing a first spatial mapping of a pair of spatial mappings and the inverse of a second matrix representing a second spatial mapping of the pair of spatial mappings.

In accordance with certain embodiments the similarity measure is based on a norm of the logarithm of the product of the first matrix and the inverse of the second matrix for each of the respective pairs.

In accordance with certain embodiments wherein the processor unit is operable such that the spatial mappings which meet a self-consistency criterion are determined based on a statistical subset selection analysis.

In accordance with certain embodiments the processor unit is operable such that the process of identifying the set of the plurality of spatial mappings which meet a self-consistency criterion takes account of a confidence measure for the respective spatial mappings.

In accordance with certain embodiments the processor unit is operable such that the confidence measure is based on a degree of correspondence between the respective elements of the first and second medical images.

In accordance with certain embodiments the consistency constraint is applied by determining the spatial mappings from each element in the first medical image and a corresponding element in the second medical image using a particle swarm optimization (PSO) technique employing parallel local swarms for determining the respective spatial mappings.

In accordance with certain embodiments when determining the spatial mapping for an element in the first medical image, the respective local swarms are biased in search space by one or more of the members selected from the group comprising: (i) locations associated with optimum values for a degree of correspondence between the element in the first medical image and previously considered corresponding elements in the second medical image; and (ii) locations associated with optimum values for a degree of correspondence between a neighboring element in the first medical image and previously considered corresponding elements in the second medical image for the neighboring element as determined by the corresponding neighboring local swarms.

In accordance with certain embodiments the method further comprises identifying an initial plurality of initial elements in the first medical image and determining an initial spatial mapping from each initial element in the first medical image to a corresponding initial element in the second medical image to provide an initial plurality of initial spatial mappings, and wherein step (b) comprises determining the spatial mapping from each element in the first medical image to the corresponding element in the second medical image by taking account of the initial plurality of initial spatial mappings.

In accordance with certain embodiments the initial spatial mappings are also subject to a consistency constraint.

In accordance with certain embodiments the plurality of elements in the first medical image are based on anatomical features represented in the first medical image.

In accordance with certain embodiments the plurality of elements in the first medical image are identified by dividing the first medical image into a plurality of geometric shapes.

In accordance with certain embodiments the respective spatial mappings comprise affine transformations.

In accordance with certain embodiments the first and second medical images comprises two-dimensional (2D) medical images.

In accordance with certain embodiments the first medical image comprises a whole-body atlas image.

Embodiments of the present invention will be described hereinafter and in the context of a computer-implemented system, method and computer program product which may be stored on a non-transitory medium. Although some of the present embodiments are described in terms of a computer program product that causes a computer, for example a personal computer or other form of workstation, to provide the functionality associated with some embodiments of the invention, it will be appreciated from the following description that this relates to only one example of some embodiments of the present invention. For example, in some embodiments of the invention, a network of computers, rather than a stand-alone computer, may implement the embodiments of the invention. Alternatively, or in addition, at least some of the functionality of the invention may be implemented by means of special purpose hardware, for example in the form of special purpose integrated circuits (e.g., Application Specific Integrated Circuits (ASICs)).

FIG. 1 is a schematic representation of an exemplary network 1 of computer controlled diagnostic devices, stand-alone computer workstations and associated equipment. The network 1 comprises three components. There is a main hospital component 2, a remote diagnostic device component 4 and a remote single user component 6. The main hospital component 2 comprises a plurality of diagnostic devices for acquiring patient images, in this example, a CT scanner 8, a MR imager 10, a digital radiography (DR) device 12 and a computed radiography (CR) device 14, a plurality of computer workstations 16, a common format file server 18, a file archive 20 and an internet gateway 15. All of these features are inter-connected by a local area network (LAN) 25.

The remote diagnostic device component 4 comprises a CT scanner 11, a common format file server 13 and an Internet gateway 17. The CT scanner 11 and file server 13 are commonly connected to the internet gateway 17, which in turn is connected via the internet to the internet gateway 15 within the main hospital component 2.

The remote single user component 6 comprises a computer workstation 21 with an internal modem (not shown). The computer workstation 21 is also connected via the internet to the internet gateway 15 within the main hospital component 2.

The network 1 is configured to transmit data within a standardized common format. For example, the CT scanner 8 initially generates a source data set, i.e. a 3D image data set, from which an operator may derive an appropriate 2D image. The 2D image is encoded in a standard image data format and transferred over the LAN 25 to the file server 18 for storage on the file archive 20. A user working on one of the computer workstations 16 may subsequently request the image, the file server 18 will retrieve it from the archive 20 and pass it to the user via the LAN 25. Similarly, a user working remotely from the main hospital component 2, either within the remote diagnostic device component 4, or the remote single user component 6, may also access and transmit data stored on the archive 20, or elsewhere on the network 1.

Figure 2:
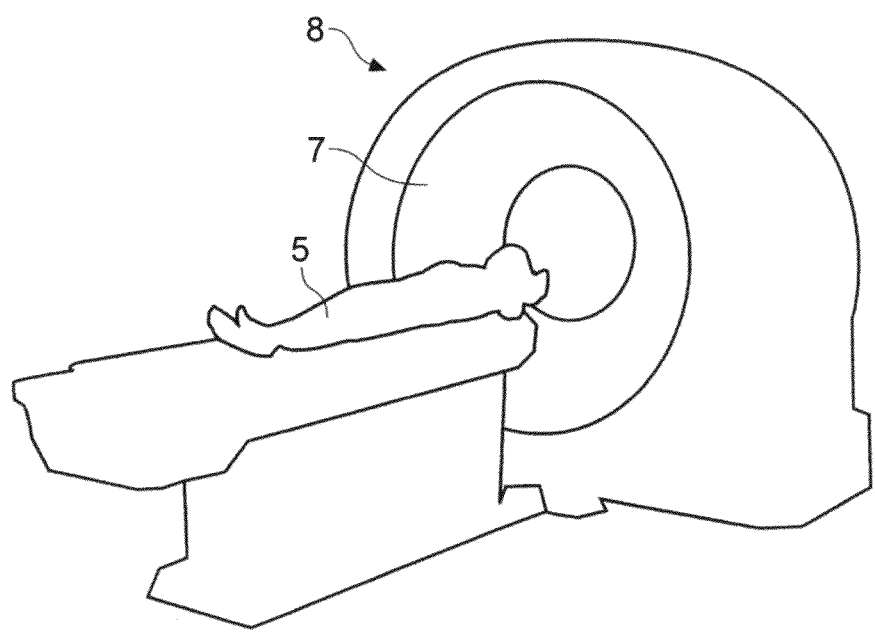
FIG. 2 shows a generic CT scanner for generating volume data.

FIG. 2 is a schematic perspective view of a generic scanner, most especially a computer-assisted tomography (CT) scanner 8 such as represented in FIG. 1, for obtaining a 3D X-ray scan of a region of a patient 5. A patient's abdomen including one or more organs or other anatomical features or body part of interest is placed within a circular opening 7 of the scanner 8. A series of image slices through the patient's abdomen is taken. Raw image data are derived from the scanner and could comprise a collection of one thousand 2D 512×512 data subsets, for example. These data subsets, each representing a slice of the region of the patient being studied, are combined to produce volume data. The volume data, which makes up a 3D image data set, comprise a collection of voxels each of which corresponds to a pixel in one of the slices. Thus the volume data are a 3D representation of the feature imaged and various user-selected 2D projections (output images) of the 3D representation can be displayed (typically on a computer monitor).

Different imaging modalities (e.g. CT, MR, PET, ultrasound) typically provide different image resolutions (i.e. voxel size), and the overall size of the volume imaged will further depend on the nature of the study. By way of concrete example, a limited volume data set may comprise an array of 512×512×320 16-bit voxels arranged on a regular Cartesian grid defined by x-, y- and z-axes, with the voxels being spaced by 0.5 mm along each axis. This corresponds to an overall imaged volume of around 25 cm×25 cm×16 cm, which is adequate to encompass an abdominal organ of interest, such as a kidney, the liver, the bowel, the spleen or the pancreas. Other volume data sets may be larger, for example encompassing a significant fraction of a patient, for example, a so-called "whole-body" image. Larger volume data sets may be built from a number of separate smaller volume data sets, or may be obtained in one acquisition. As is conventional, the volume data are typically aligned with transverse, sagittal and coronal planes. The xy-axes are in a transverse plane, the xz-axes are in a coronal plane and the yz-axes are in a sagittal plane.

Figure 3:
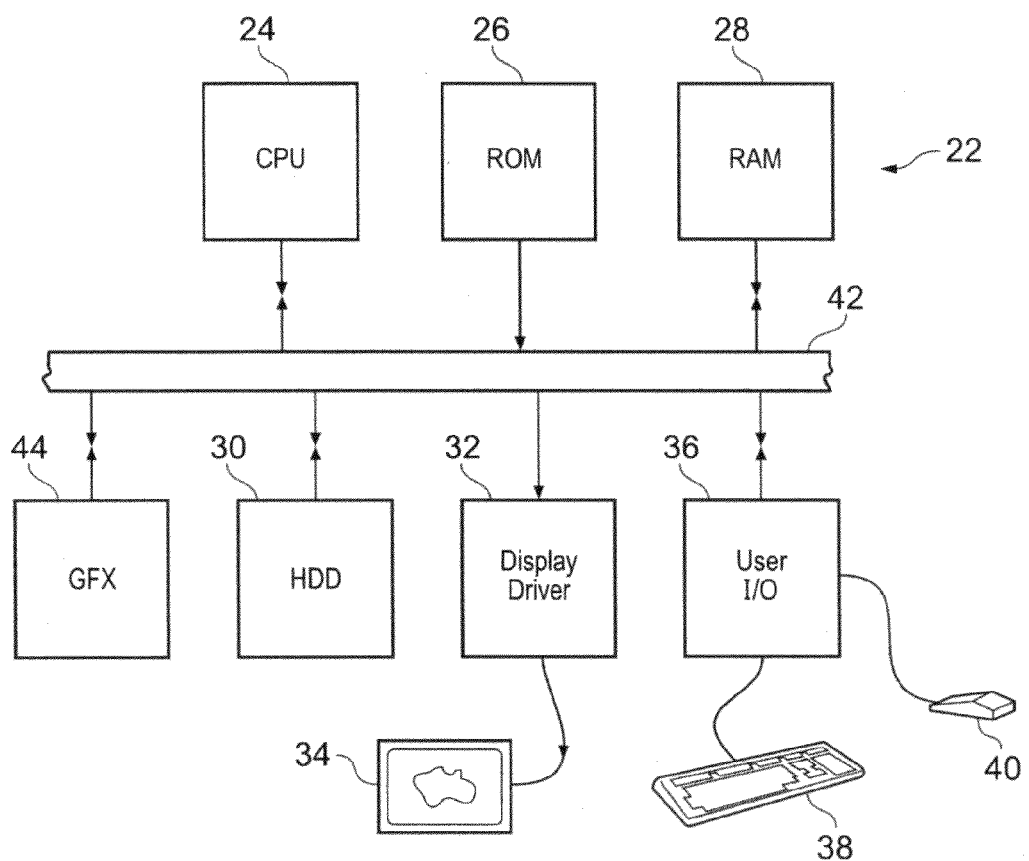
FIG. 3 schematically shows a computer for processing image data.

FIG. 3 schematically illustrates a general purpose computer system 22 configured to perform processing of medical image data in accordance with an embodiment of the invention. The computer 22 includes a central processing unit (CPU) 24, a read only memory (ROM) 26, a random access memory (RAM) 28, a hard disk drive 30, a display driver 32 and display 34 and a user input/output (IO) circuit 36 with a keyboard 38 and mouse 40. These devices are connected via a common bus 42. The computer 22 also includes a graphics card 44 connected via the common bus 42. The graphics card includes a graphics processing unit (GPU) and random access memory tightly coupled to the GPU (GPU memory).

The CPU 24 may execute program instructions stored within the ROM 26, the RAM 28 or the hard disk drive 30 to carry out processing of medical image data that may be stored within the RAM 28 or the hard disk drive 30. The RAM 28 and hard disk drive 30 are collectively referred to as the system memory. The GPU may also execute program instructions to carry out processing image data passed to it from the CPU.

Figure 4:
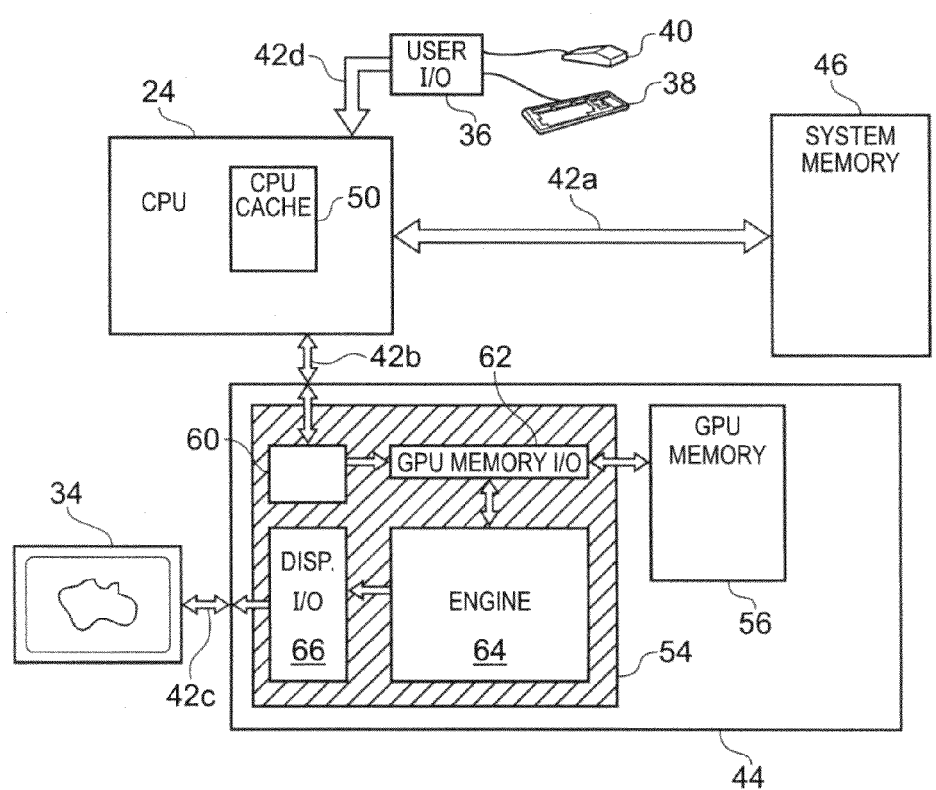
FIG. 4 schematically shows some of the features of the computer of FIG. 3 in more detail.

FIG. 4 schematically shows some of the features of the computer system shown in FIG. 3 in more detail. The RAM 28 and hard disk drive 30 are shown collectively as a system memory 46. Medial image data obtained from the scanner 8 shown in FIG. 2 is stored in the system memory as shown schematically in the figure. To assist in showing the different data transfer routes between features of the computer system 22, the common bus 42 shown in FIG. 3 is schematically shown in FIG. 4 as a series of separate bus connections 42a-d. A first bus connection 42a connects between the system memory 46 and the CPU 24. A second bus connection 42b connects between the CPU 24 and the graphics card 44. A third bus connection 42c connects between the graphics card 44 and the display 34. A fourth bus connection 42d connects between the user I/O 36 and the CPU 24. The CPU includes a CPU cache 50. The graphics card 44 includes a GPU 54 and a GPU memory 56. The GPU 54 includes circuitry for providing an accelerated graphics processing interface 60, a GPU cache I/O controller 62, a processing engine 64 and a display 110 controller 66. The processing engine 64 is designed for optimized execution of the types of program instructions typically associated with processing medical image data sets.

A user is able to select desired processing parameters using the keyboard 38 and mouse 40 in combination with a graphical user interface (GUI) displayed on the display 34, for example using a movable screen icon in combination with a mouse, track pad etc. to point and click, a touch screen or other known techniques.

Methods described herein can be used within a hospital environment. In this case, the methods may usefully be integrated into a stand-alone software application, or with a Picture Archiving and Communication System (PACS). A PACS is a hospital-based computerized network which can store volume data representing diagnostic images of different types in a digital format organized in a single central archive. For example, images may be stored in the DICOM format. The archive is connected to a computer network provided with a number of workstations, so that users all around the hospital site can access and process patient data as needed. Additionally, users remote from the site may be permitted to access the archive over the Internet.

A user such as a radiologist, a consultant, or a researcher can access any medial image data set from the workstation, and generate display images, such as a still image of a 2D or 3D data set or moving images from a 4D data set.

In accordance with some embodiments of the invention, a computer implementation employing computer program code for storage on a data carrier or in memory can be used to control the operation of the CPU and GPU of the computer system. The computer program can be supplied on a suitable carrier medium, for example a storage medium such as solid state memory, magnetic, optical or magneto-optical disk or tape based media. Alternatively, it can be supplied on a transmission medium, for example a medium with a carrier such as a telephone, radio or optical channel.

FIGS. 5A and 5B schematically show a first medical image 101 and a second medical image 102 which may be registered with one another according to an embodiment of the invention. In this example the first image 101 is a whole body reference image (which may also be referred to as atlas image) and the second image 102 is a patient study image (which may also be referred to as a novel image). The images 101, 102 in this example are conventional 2D medical images derived from 3D CT data in accordance with conventional techniques (for example by establishing a maximum intensity projection for a desired view direction). It will be appreciated the specific nature and type of the medical images is not significant to the underlying registration process. It will also be appreciated that the reason for performing the registration is not significant. For example, in some cases a user may wish to establish a registration mapping between the reference image and the study image so that one of the images can be transformed by the registration mapping to allow direct visual comparison of the two images when displayed on a display. In other cases, there may be a desire to establish a registration mapping between the images to aid the identification of anatomical features in the study image by applying the determined registration transform to the known location of a corresponding feature previously identified in the reference image.

In accordance with certain embodiments of the invention a process for determining a registration mapping between the reference image 101 and the study image 102 may broadly be considered to comprise three main steps.

Figure 6A:
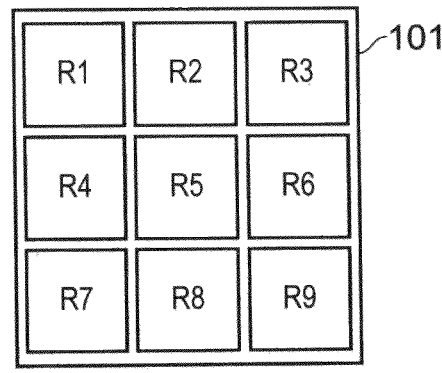
FIG. 6A schematically represents a step of dividing a reference image into a plurality of elements in accordance with an embodiment of the invention.

FIG. 6A schematically represents a first step in which the reference image 101 is divided (partitioned) into a plurality of elements (patches). In this example the reference image is divided into nine rectangles arranged on a uniform grid and labeled R1, R2, R3, R4, R5, R6, R7, R8 and R9. For ease of representation the elements are shown in FIG. 6A as being spaced apart from one another, but in general the elements will be contiguous with one another. In some cases only a fractional part of the reference image might be divided into elements for further processing. This might be appropriate where only a portion of the reference image 101 is of interest, for example, because the reference image contains anatomical features that are not covered by the study images or which are simply not of interest for current study, In a second step, a spatial mapping (transform) from each element in the reference image to what is identified as a most-likely corresponding element in the study image is determined, thereby providing a plurality of spatial mappings. In some respects this approach may be referred to as piece-wise registration. In some example embodiments the individual spatial mappings may be determined according to conventional registration techniques. For example, a Powell Optimizer technique may be used to establish for each element of the reference image which affine transformation optimizes a similarity measure between the element of the reference image and corresponding transformed element of the study image. The similarity measure may, for example, be based on a correlation coefficient between the elements in the two images.

Figure 6B:
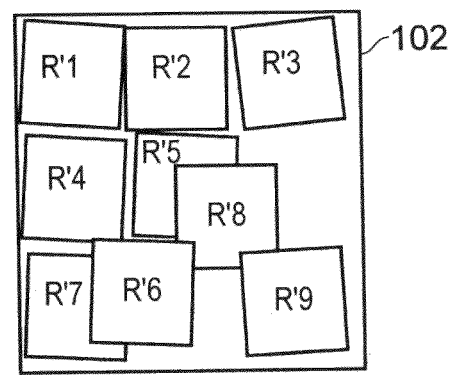
FIG. 6B schematically represents an initial mapping of elements of the reference image of FIG. 6A onto a study image in accordance with an embodiment of the invention.

FIG. 6B schematically represents a plurality of individual spatial mappings that might be determined for the elements of the reference image 101 shown in FIG. 6A. These mappings are represented by a schematic overlay on the study image 102 of the elements of the reference image 101 following transformation by their respective individually determined mappings. The schematically represented transformations of the elements of the reference image 101 shown in FIG. 6B are labeled R'1, R'2, R'3, R'4, R'5, R'6, R'7, R'8 and R'9. Thus, the piece-wise registration process has determined that element R1 in the reference image 101 shown in FIG. 6A best matches a portion of the study image 102 which is labeled R'1 in FIG. 6B. That is to say, the piece-wise registration process has determined that element R1 in the reference image 101 most likely corresponds with the region labeled R'1 in the study image 102 and furthermore has established the associated spatial mapping. The degree of correspondence between the element R1 in the reference image 101 and the correspondingly identified element R'1 in the study image 102 may be considered a measure of the "goodness of fit" for the determined mappings, i.e. a confidence measure. The degree of correspondence may, for example, by parameterized by a measure of the correlation between the two regions of the respective images and/or other measure of the mutual information contained in the respective elements of the two images.

In a third step the set of spatial mappings associated with the respective elements of the reference image are analyzed for consistency. There are a number of different ways in which this can be done, as discussed further below. Individual spatial mappings which are deemed to be inconsistent with the other spatial mappings are modified. For example, inconsistent spatial mappings may be replaced by a new spatial mapping based on the spatial mappings which are determined to be self-consistent. For example, inconsistent spatial mappings may be replaced with the average of the self-consistent spatial mappings, or inconsistent spatial mapping may be replaced by a spatial mapping associated with a nearest-neighbor element(s) of the reference image which is considered consistent with the other spatial mappings.

Referring to FIGS. 6A and 6B, it can be seen that the individual spatial mappings determined for elements R1, R2, R3, R4, R5, R7 and R9 are broadly consistent, whereas the individual spatial mappings determined for elements R6 and R8 are inconsistent with the other spatial mappings. This is apparent from the fact the spatial relationship among the elements R1, R2, R3, R4, R5, R7 and R9 in the reference image as represented in FIG. 6A is broadly similar to the spatial relationship among the corresponding elements R'1, R'2, R'3, R'4, R'5, R'7 and R'9 in the source image as represented in FIG. 6B. However, this is not the case for the elements R6 and R8. In accordance with an embodiment of the invention, this inconsistency in spatial mappings for the elements R6 and R8 is taken to be an indication that the determined spatial mappings for these elements has failed to correctly identify elements of the study image which properly correspond with elements of the reference image.

Thus, in accordance with an embodiment of the invention, the individual mappings associated with elements R6 and R8 may be modified. In this example it is assumed spatial mappings for the elements R6 and R8 are replaced with a spatial mapping corresponding to an average mapping for the other elements (R1, R2, R3, R4, R5, R7 and R9).

Figure 6C:
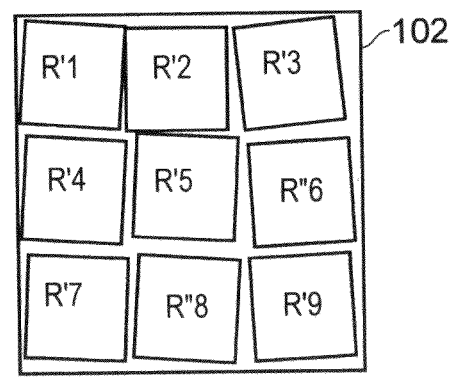
FIG. 6C schematically represents a modification of the initial mapping of elements of the reference image of FIG. 6A onto the study image of FIG. 6B.

FIG. 6C is similar to, and will be understood from, FIG. 6B, but schematically represents the plurality of individual spatial mappings following the modification of the mappings associated with elements R6 and R8 in the reference image 101 as discussed above. The schematically represented modified transformations of the elements R6 and R8 of the reference image 101 shown in FIG. 6C are labeled R"6 and R"8.

Thus in a general sense the individual mappings represented in FIG. 6C are obtained by determining a spatial mapping from each element in the reference image to a corresponding element in the study image to provide a plurality of spatial mappings in a manner which is constrained for self-consistency among the various spatial mappings.

Having determined individual mappings for the elements of interest in the reference image 101 as discussed above, an overall registration mapping between the reference image and the study image may be determined based on the individual spatial mappings. Methods in accordance with embodiments of the invention may further comprise providing output data representing the registration mapping for use in further processing/displaying aspects of the reference and/or study images. Since in many cases the purpose of performing piecewise registration is for atlas-based segmentation, and the portioning of the reference image (the atlas) is often made on an anatomical basis, atlas masks associated with elements of the reference image from previous segmentation of the reference image can be propagated from each reference patch directly onto the novel/study image according to the relevant mappings. If structures of interest span more than one patch, then it is possible to interpolate between the mappings, for example using established poly-affine methods, to transfer segmentation information associated with the reference image to the novel image.

It will of course be appreciated that the above described general approach may be modified in accordance with other embodiments of the invention. For example, whilst in the above-described approach the consistency constraint is applied after determining initial mappings for each element of the reference image, in another example, the initial mappings may be determined in a manner which is inherently constrained for self-consistency. That is to say, the process of determining the individual spatial mappings and the application of the consistency constraint may be performed in parallel (i.e. the second and third steps discussed above may in effect be performed at the same time in a single step).

Having described a general approach of some embodiments of the invention, a more specific example is now described with reference to FIG. 7 which is a flowchart schematically representing processing in accordance with an embodiment of the invention.

In a first step S1, medical image data representing a reference image and a study image are obtained. These data may in principle be obtained directly from an imaging modality, but in practice will more likely be previously-obtained data loaded from a memory associated with computing apparatus configured to perform the processing described herein. The data may represent any format of medical image for which registration is desired and may be represented by any conventional data structure. In this example it is assumed the reference image and study image correspond with the conventionally rendered CT images shown in FIGS. 5A and 5B.

In a second step S2, the reference image 101 is notionally divided into a plurality of elements. In some examples the reference image may be divided on the basis of identified anatomical features, while in other examples, the reference image may be divided more arbitrarily, for example based on a regular grid pattern.

Figures 8A, 8B:
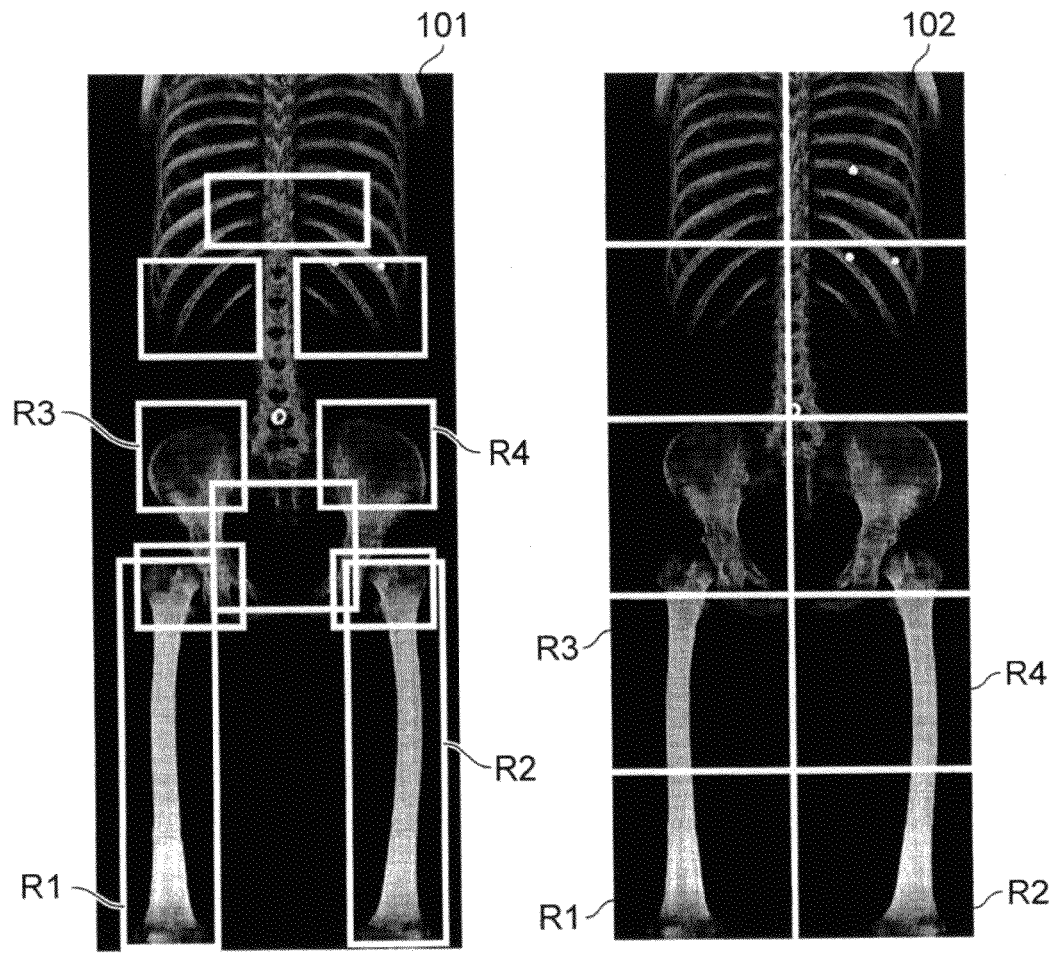
FIGS. 8A and 8B schematically represent two ways of dividing an image into a plurality of elements in accordance with an embodiment of the invention.

FIG. 8A schematically represents the reference image 101 divided into a plurality of elements R1, R2, R3, R4 . . . on the basis of identified anatomical features. This division may be based, for example, on automatic segmentation techniques, or more likely in the case of a standard reference (atlas) image, on the basis of previous manual identification. In this example, element R1 is a rectangle encompassing a right femur, element R2 is a rectangle encompassing a left femur, element R3 is an element containing an upper-right pelvic region, element R4 is an element containing an upper-left pelvic region, and so forth for other anatomical features. In this example there are a total of eight elements identified in the reference image 101. It will be noted there are parts of the reference image 101 which in this example are not included in the division. For example, the upper chest area of the reference image 101 is not associated with any of the elements represented in FIG. 8A. This is because in this case the study image 102 (see FIG. 5B) does not span this part of the patient and so there is nothing to register with this part of the reference image.

FIG. 8B schematically represents an alternative approach in which the reference image 101 is divided into a plurality of elements R1, R2, R3, R4 . . . on the basis of a simple regular grid (e.g. such as schematically shown in FIG. 6A). In this particular example, the reference image is divided into approximate squares arranged continuously in five rows and two columns.

The most appropriate manner for dividing an image in accordance with an embodiment of the invention may be based on a fixed division scheme, for example dividing into a fixed number of rows and columns or anatomical features, or maybe tuned for a particular application at hand. For example, for registering two particular types of image a series of tests may initially be performed using different divisions for the reference image to identify which division provides optimum results, and then this optimum division may be used when performing subsequent image registrations. In general, a large number of elements (i.e. a relatively fine division of the reference image) can help in mapping the individual elements where there is a wide range in anatomical variation between the reference image and the study image. However, a smaller number of elements (i.e. a relatively coarse division of the reference image) can help in determining individual mappings with a higher degree of confidence.

In a third step S3, individual mappings between the respective elements of the partitioned reference image and elements of the study image identified as corresponding to the elements of the reference image are identified. This may be achieved using conventional techniques for searching the space of potential transforms for each element of the reference image to a region of the study image and identifying the transform which when applied to the element of the reference image most closely corresponds with the corresponding region of the study image. This piece-wise registration may be based on searching the space of potential affine transformations to optimize a similarity measure (e.g. a correlation coefficient) between the transformed element of the reference image and a corresponding region of the study image. In this example implementation there is no initialization of the process of determining the individual mappings (i.e. there is no a priori guidance) so it may be appropriate to select an optimization process suited to finding global optimum. There are various established optimization techniques that may be used, for example based on an exhaustive search or a random search. For examples, approaches such as those described by Rouet et al. in Genetic algorithms for a robust 3-D MR-CT registration, IEEE Transactions on Information Technology in Biomedicine, Volume 4, Issue 2, June 2000, pages 126-136 and Mandava et al in Adaptive search space scaling in digital image registration, IEEE Transactions on Medical Imaging, Volume 8, Issue 3, 1989, pages 251-262, could be used.

Thus, the third step results in the determination of a set of individual spatial mappings corresponding to the respective elements into which the reference image has been divided (e.g. as schematically represented in FIG. 6B).

In a fourth step S4, the set of individual spatial mappings resulting from step S3 are considered in order to identify which of the spatial mappings are self-consistent, and which of the spatial mappings are inconsistent with the others. There are a number of ways this may be achieved and in this example embodiment an approach based on hierarchical clustering techniques is adopted.

Hierarchical clustering can be applied to establish groups of spatial mappings which are self-similar. Any spatial mappings outside the largest self-similar group (cluster) may be taken to represent the inconsistent mappings (if any). Other ways of identifying the "correct" cluster (i.e. the cluster which contains what are to be assumed to be the proper self-consistent spatial mappings) may be adopted. For example, instead of (or as well as) taking account of the number of mappings in each cluster, account may also be taken of a measure of the similarity between pairs of spatial mappings within each cluster, for example based on the similarity measure used for establishing the clusters, as discussed further below. Clusters for which the members are most similar to each other may be considered more likely to represent the cluster of the "correct" spatial mappings.

In order to apply a hierarchical clustering technique a similarity measure between different pairs of spatial mappings is established and used as the basis for identifying clusters. Such a similarity measure is often referred to as a "distance".

Spatial mappings may be represented as matrices and a similarity measure for use by a hierarchical clustering algorithm will generally be a scalar quantity. The inventors have recognised that an appropriate scalar quantity to use as a similarity measure (distance) between respective pairs of spatial mappings can be based on a logarithm of the product of a matrix representing one of the spatial mappings and the inverse of a matrix representing the other of the spatial mappings, and in particular the distance may be derived from the norm of such a logarithm.

For example, a distance $d_G$ between spatial mapping A and spatial mapping B may be defined as:

$$d_G(A,B) = \text{norm}\{\log(AB^{-1})\}_F$$

The distance $d_G$ may be referred to as a geodesic distance between the matrices A and B representing the two spatial mappings. $B^{-1}$ is the inverse of B, $\log(AB^{-1})$ is the logarithm of the product of A and $B^{-1}$, and the function "norm $\{\ldots\}_F$" is the Frobenius norm.

Thus, having defined a distance between respective pairs of spatial mappings, the spatial mappings may be formed into groups (clusters) using a conventional hierarchical clustering techniques, for example with an approach based on the single-linkage clustering technique described by Gower and Ross in "Minimum Spanning Trees and Single Linkage Cluster Analysis", Journal of the Royal Statistical Society, Series C (Applied Statistics), Vol. 18, No. 1 (1969), pp. 54-64. Other hierarchical clustering techniques could be employed, for example those based on average-linkage or complete-linkage algorithms, such as described by Sneath and Sokal in "Numerical Taxonomy", Freeman, San Francisco 1973. Other conventional clustering techniques could equally be employed.

Conventional techniques can also be employed to determine an appropriate number of clusters into which the spatial mappings should be grouped (i.e. to determine the stage at which the hierarchical clustering algorithm should stop). In this example embodiment an approach based on the techniques described by Akaike in "A new look at the statistical model identification", IEEE Transactions on Automatic Control 19 (6): 716-723, 1974, is used. Other techniques for determining the appropriate number of clusters into which the spatial mapping should be grouped could be used. For example a fixed number of clusters might be defined, for example, two, three or four or more clusters. The inventors have generally found for typical medical imaging applications that three clusters can be a good choice. Another technique might be to simply continue clustering (with a bottom-up clustering approach) until there is a single cluster containing a predefined fraction of the total number of spatial mappings under consideration (for example a fraction equal to 0.5, 0.6, 0.7, 0.8 or 0.9). A corresponding technique can be used for a top-down clustering approach (what might be termed a fragmentation approach) by stopping splitting the spatial mappings into further fragments (clusters) where there seems to be any clusters containing the predefined fraction of the total number of spatial mappings.

In a fifth step S5, individual mappings established in S3 which are deemed to be inconsistent with the other mappings are modified. There are a number of ways this can be done. For example, the inconsistent mappings may be replaced with an average of the consistent mappings. In some examples, the determination of the average of the consistent mappings may be weighted by a confidence measure for the respective mappings, for example based on the associated similarity measure. Thus mappings having a high degree of confidence (i.e. a high correspondence between the transformed element of the reference image and the corresponding element of the study image) may contribute more significantly when determining an average to use for the inconsistent mappings. In another example, an inconsistent mapping for a given element in the reference image may be replaced with a mapping derived from mappings for one or more neighboring elements in the reference image which are not deemed inconsistent. In yet another example, a new mapping may be determined for an element associated with an inconsistent mapping by re-calculating a mapping for that element in a way which is constrained by the self-consistent mappings. For example, the space of potential transforms searched to establish the optimized mapping may be constrained based on the self-consistent mappings. For example, the various parameters of a newly-determined mapping (e.g. corresponding to translations and magnifications along different directions, rotation and so on) may be constrained to fall within the range of corresponding parameters for the self-consistent mappings.

Thus, the fifth step results in the determination of a set of individual spatial mappings corresponding to the respective elements into which the reference image has been divided which have been generated in a manner subject to a self-consistency constraint (e.g. as schematically represented in FIG. 6C).

Figure 9A:
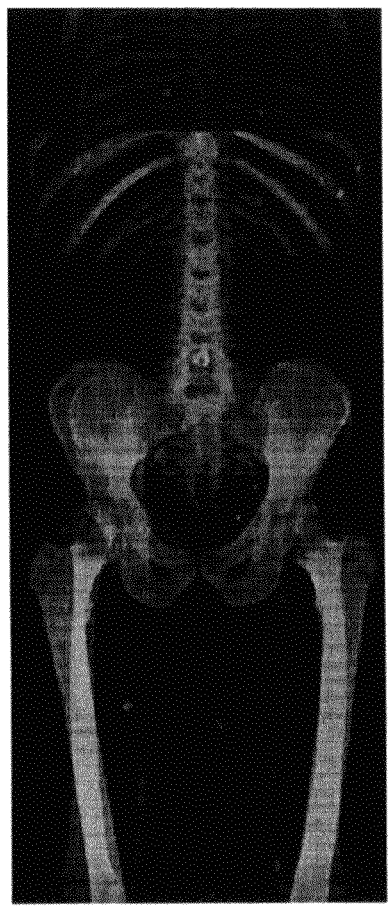
FIG. 9A schematically shows the reference image of FIG. 5A overlain by the study image of FIG. 5B following image registration in accordance with a conventional technique.

In a sixth step S6, the set of self-consistent individual spatial mappings obtained in the fifth step are used to establish an overall registration mapping between the reference image and the study image. An output dataset representing the mapping may thus be generated FIG. 9A schematically shows the reference image of FIG. 5A overlain by the study image of FIG. 5B following image registration in accordance with a conventional global registration technique. It can be seen that the mapping is not especially good. For example there is particularly poor overlap of the femurs and the lower rib cage, as well as significant discrepancies in the pelvic region. Only the central spinal region would seem to be moderately well represented. This poor registration detracts from the value of the registration process. For example, if one were wishing to automatically identify the location of a particular anatomical feature in the study image, such as the upper outer boundary of the patient's right-hand femur, based on the known location of the corresponding anatomical feature in the reference image following transformation in accordance with the image registration, the result would be disappointing. This is because the known location for the feature of interest in the reference image when transformed to the study image based on the determined registration does not closely match the location for the corresponding anatomical feature in the study image.

Figure 9B:
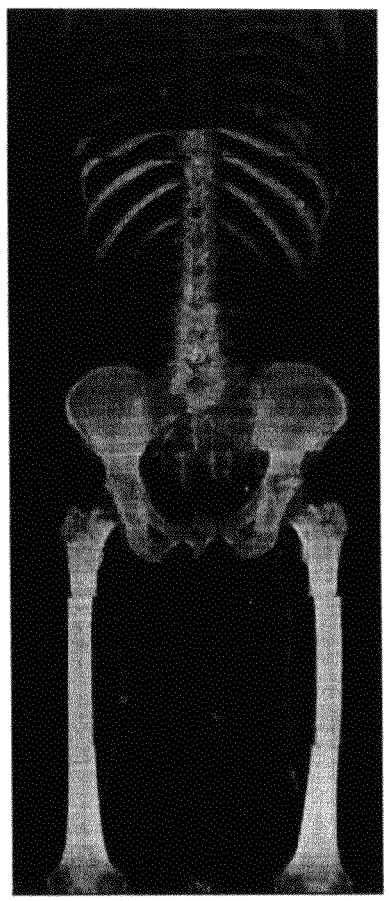
FIG. 9B schematically shows the reference image of FIG. 5A overlain by the study image of FIG. 5B following image registration in accordance with an embodiment of the invention.

FIG. 9B, on the other hand, schematically shows the reference image of FIG. 5A overlain by the study image of FIG. 5B following image registration in accordance with an embodiment of the invention. It can be immediately seen that the degree of correspondence between the two images is much greater in FIG. 9B than in FIG. 9A, and this significantly increases the value of the registration process, regardless of the underlying reason for performing the registration.

Thus, in accordance with certain embodiments of the invention such as described above there is provided a method and apparatus for improving on established techniques for determining image registrations.

It will be appreciated the above description has focused only on some embodiments, and there are many variations which may be made.

Figure 7:
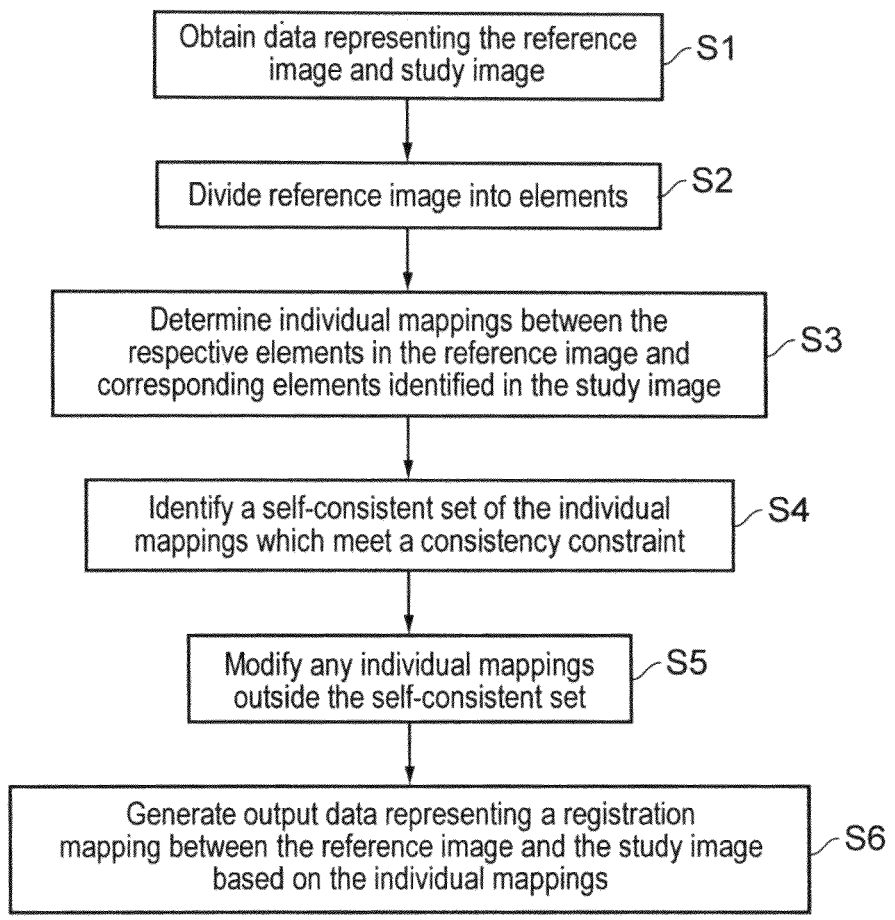
FIG. 7 is a flowchart schematically representing processing in accordance with an embodiment of the invention.

For example, in accordance with the above described embodiments the plurality of spatial mappings for each of the elements of the reference image are subject to a consistency constraint by a process of first establishing a spatial mapping for each element of the reference image (e.g. see step S3 of FIG. 7), and then identifying and modifying any of the initially determined individual spatial mappings which are considered to be inconsistent with the others (e.g. see steps S4 and S5 of FIG. 7). In other examples, the plurality of spatial mappings for each of the elements of the reference image may be determined in a manner which is inherently subject to a consistency constraint. That is to say, a consistency constraint may be applied during the process of initially determining the spatial mappings rather than in a separate and subsequently performed step. One way of doing this is to use a modified particle swarm optimization (PSO) technique for determining the initial spatial mappings for each element of the reference image.

Particle swarm optimization is an established computational method that optimizes a problem by iteratively trying to improve a candidate solution with regard to a given measure of quality. PSO optimizes a problem by having a population of candidate solutions, dubbed particles, and moving these particles around in the search-space according to simple mathematical formulae over each particle's quality, position and velocity. Thus, in an implementation in accordance with an embodiment of the invention, in each iteration each particle represents a candidate spatial mapping in the search space of potential mappings, and the given measure of quality may be a measure of similarity between the element of the reference image subject to the spatial mapping being tested and the corresponding portion of the study image (e.g. a correlation based parameter). Each particle's movement in search space may be influenced by how well mappings for that particle have performed in previous iterations (e.g. whether the particle is moving towards or away from a better solution than its current solution) and may also be influenced by the movement of other particles in the search space. For example, if one particular particle happens across a mapping which provides a very high measure of quality (correlation with the study image) other particles may be guided towards this mapping in search space. Thus the PSO approach is expected to move a swarm toward the best solution(s).

Thus, in accordance with some embodiments of the invention, PSO techniques may be employed for determining an appropriate spatial mapping for each element of the reference image. Thus, in order to determine a plurality of spatial mappings corresponding to a plurality of elements in the reference image, there may be a plurality of swarms, with each swarm acting to identify the optimum mapping for each respective elements of the reference image.

Thus, in accordance with some embodiments of the invention, the optimum spatial mappings for each element of the reference image may be determined in parallel through use of parallel local swarms. The use of parallel swarms is a generally known technique for avoiding local optima when solving a single problem. However, in accordance with embodiments of the invention, the technique may be extended to cover the situation of different swarms solving different, but related, problems (i.e. determining the most appropriate spatial mappings for the different elements of the reference image). In order to apply a consistency constraint to the set of spatial mappings, the individual local swarms may be guided by other swarms associated with other elements of the reference image. There are several ways in which this can be done, but in general this approach corresponds with applying an additional bias to the individual particles of an individual swarm as they move through search space testing different spatial mappings, wherein the bias is based on the movement of other swarms.

Thus each particle in a swarm may be biased to move through search space taking account of its own previously-determined best location in the search space (the space of affine transformations), the previously-determined best location in the search space already searched by its own local swarm, and additionally, an average of the previously-determined best locations for swarms associated with other elements of the reference image. For example all other swarms, or immediate neighbor swarms (i.e. swarms associated with a neighboring element of the reference image), or another appropriate subset of swarms.

There are thus three aspects to the particle swarm approach. In a first aspect an individual particle corresponds to a single candidate registration (mapping) of a single reference image element (atlas patch). In a second aspect a local swarm of particles seeks to optimize the registration of a single reference image element. These two aspects broadly correspond with established particle swarm techniques. However, in accordance with some embodiments of the invention, in a third aspect of the approach a set of local swarms work in parallel to register different elements of the reference image to the study image. Particles within a local swarm communicate with each other in accordance with generally-established PSO techniques so that they are biased to converge on a solution for a single element of the reference image. In addition, local swarms communicate with each other to in effect exchange information with other swarms. Thus each swarm is biased by the other swarms and this inherently provides a tendency towards self-consistent solutions for the different elements.

Having described a general approach of some embodiments of the invention based on a PSO approach, a more specific example is now described with reference to FIG. 10 which is a flowchart schematically representing processing in accordance with an embodiment of the invention.

In a first step T1, medical image data representing a reference image and a study image are obtained. This step is similar to, and will be understood from the corresponding step S1 described above with reference to FIG. 7.

In a second step T2, the reference image is notionally divided into a plurality of elements. This step is similar to, and will be understood from the corresponding step S2 described above with reference to FIG. 7.

In a third step T3, a local particle swarm is allocated for each element of the reference image (atlas patch). Each particle in each swarm may be initialized to, a random spatial mapping. This step of allocating particle swarms may follow the generally established principles associated with PSO techniques.

in a fourth step T4, a similarity measure (e.g. a correlation coefficient) is determined for each particle in each swarm by applying the corresponding spatial mapping to the relevant element of the reference image, and comparing the result with the study image. A new location for each particle of each swarm in the search space of available spatial transforms is then determined in accordance with the generally established principles associated with PSO techniques. However, in accordance with an embodiment of the invention, the new location for each particle is biased by a combination of: (i) the location in search space of the previously-determined optimum position for the particle; (ii) the location in search space of the previously-determined optimum position for the local swarm; and, significantly, (iii) an average of previously-determined optimum positions in search space for swarms for other elements. In each case, the optimum position will be the previously tested position (including the current iteration) having the highest similarity measure.

In a fifth step T5, a determination is made as to whether or not the particles in each swarm have converged on a best solution (i.e. a determination of a spatial mapping between the reference image and a most-likely corresponding portion of the study image). This step may be based on generally established principles associated with PSO techniques.

If it is established in step T5 that the particles in each swarm have not converged, processing follows the branch marked "N" and returns to step T4 for a further iteration. Thus, the process is configured to iterate step T4 until the particles in each swarm have converged on their respective solutions. If it transpires that the particles in a swarm associated with a particular element have converged whilst others have not, further iterations of step T4 may not include the swarms associated with elements of the reference image for which a converged solution has already been found.

If it is established in step T5 that the particles in each swarm have converged on their respective solutions, processing follows the branch marked "Y" to a sixth step T6 in which individual spatial mappings for each element of the reference image are extracted from the "best particle" in each local swarm, i.e., the particle associated with the highest similarity measure.

In a seventh step T7, the set of self-consistent individual spatial mappings obtained in the sixth step T6 are used to establish an overall registration mapping between the reference image and the study image. An output dataset representing the mapping may thus be generated. This step is similar to, and will be understood from the corresponding step S6 described above with reference to FIG. 7.

Figure 10:
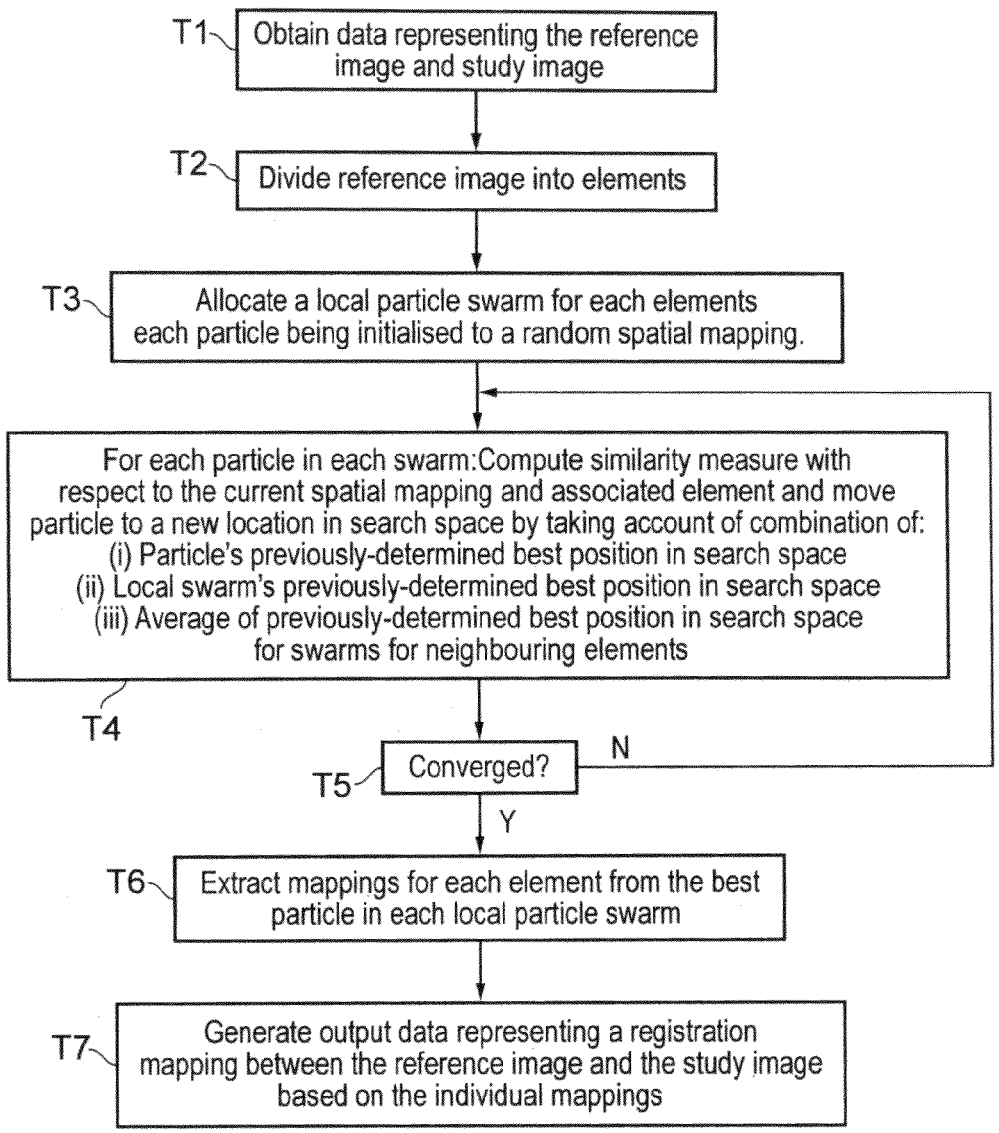
FIG. 10 is a flowchart schematically representing some aspects of processing in accordance with an embodiment of the invention.

Thus the processing of FIG. 10, represents another mechanism for establishing a registration mapping between a first medical image and a second medical image which is based on determining a spatial mapping from elements in the first medical image to corresponding elements in the second medical image to provide a plurality of spatial mappings subject to a consistency constrain. In this example the consistency constraint is provided by biasing the traverse of mapping search space for each element based on previously determined optimum positions in search space for swarms for other elements (in step T4 of FIG. 10). This biasing inherently guides the finally-determined spatial mappings for each element (extracted in step T6 of FIG. 10) to a self-consistent set.

Thus, as described above, there are a number of ways of determining the spatial mappings for the respective elements of the reference image in a manner which is subject to a consistency constraint/consistency analysis in accordance with embodiments of the invention.

In the above-described example embodiments, the initially-determined spatial mappings have generally started "blind". That is to say, there has been no initial guidance provided for the search. In other example embodiments, processing in accordance with embodiments of the invention such as described above, and shown in FIGS. 7 and 10, may be modified to provide a degree of initialization for the step of determining the spatial mappings. For example, the inventors have found improved results can in some circumstances be achieved by in effect repeating the process of determining a self-consistent set of mappings for elements of the reference image twice. A first stage is based on no initialization information while a second stage is based on initialization information obtained from the first stage.

For example in one implementation, processing which is generally in accordance with FIG. 7 may be performed in a first stage with the reference image divided into elements in step S2 in a manner such as represented in FIG. 8A, i.e. based on identified anatomical features (what might be referred to as "regions of interest"—ROI). However, instead of performing step S6 once a self-consistent set of individual mappings for the ROI elements has been established in step S5 in this first processing stage, processing might instead return to step S2 for a second stage of processing in which the reference image is now divided into a regular grid, for example such as represented in FIG. 8B.

Processing corresponding to step S3 in FIG. 7 in this second stage may then be performed for the regular grid elements with the individual mappings between the respective elements in the reference image and the corresponding elements in the study image being initialized based on the results obtained in step S5 for the ROI elements in the first stage.

For example, for each grid element in the second stage processing, the closest ROI element from the first stage processing may be identified (i.e. the ROI element from the first stage processing having a centroid which is closest to the centroid of the grid element in the second stage). For each grid element in the second stage of processing, the previously determined spatial mapping for the closest ROI in the first stage of processing may then be used to initialize the determination of a spatial mapping for the grid element in the second stage of processing.

This two-stage approach in which the results of the first stage (based, for example, on ROI elements such as shown in FIG. 8A) are used to initialize the step of determining indigent mappings for the second stage (based, for example, on grid elements such as shown in FIG. 8B) has been found in some cases to provide improved results over a single stage non-initialized process.

Embodiments of the invention may include incorporating the methods and associated computer programs described herein as a component in a volume rendering application.

A computer program product bearing machine readable instructions for carrying out the method is disclosed.

A computer loaded with and operable to execute machine readable instructions for carrying out the method is disclosed.

A computer program product is disclosed. Examples of a computer program product bearing machine readable instructions for carrying out the method described above are the mass storage device HDD 30 of FIG. 3, the ROM 26 of FIG. 3, the RAM 28 of FIG. 3 and the system memory 46 of FIG. 4, and the servers 13, 18 of FIG. 1. Other forms of computer program product include a spinning disk based storage device such as a CD or DVD, or a USB flash memory device.

Examples of a computer loaded with and operable to execute machine readable instructions for carrying out the method described above are the computer of FIG. 3, the computer of FIG. 4, and individual elements, e.g. terminals or collective multiple elements of the computer network system shown in FIG. 1, e.g. one of the servers 13, 18 in combination with one or more of the terminals or computers provided with the medical imaging devices.

Examples of a computer program product bearing machine readable instructions for carrying out the method described above are the mass storage device HDD 30 of FIG. 3, the ROM 26 of FIG. 3, the RAM 28 of FIG. 3 and the system memory 46 of FIG. 4, and the servers 13, 18 of FIG. 1. Other forms of computer program product include a spinning disk based storage device such as a CD or DVD, or a USB flash memory device.

While the method has been primarily described with reference to CT medical image data sets collected by conventional CT scanners, the principles described herein are more generally applicable to other 2D and 3D data sets, and also so-called 4D data sets, i.e. time sequences of volume image data sets. For example, the method may be applied to other imaging types used in the medical field, referred to as modalities. In particular, the methods described herein may be applied to MR images and PET images as well as to images of merged data sets from two modalities such as CT and PET.

While certain embodiments have been described, these embodiments have been presented by way of example only, and are not intended to limit the scope of the inventions. It will be appreciated that features and aspects of the invention described above in relation to certain embodiments of the invention are equally applicable and may be combined with other features and aspects of other embodiments of the invention as appropriate. The novel methods, computers and computer program products and devices described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A computer system operable to determine a registration mapping between a first medical image and a second medical image, the computer system comprising:
   a storage device for storing data representing the first medical image and the second medical image; and
   a processor unit operable to execute machine readable instructions to:
   (a) identify a plurality of elements in the first medical image;
   (b) determine a spatial mapping from each element in the first medical image to a corresponding element in the second medical image to provide a plurality of spatial mappings subject to a consistency constraint; and
   (c) determine a registration mapping between the first medical image and the second medical image based on the plurality of spatial mappings from the respective elements of the first medical image to the corresponding elements of the second medical image,
   wherein the processor unit is operable such that the consistency constraint is applied by identifying inconsistent spatial mappings which are outside a set of the plurality of spatial mappings which meet a self-consistency criterion and modifying the inconsistent spatial mappings for improved consistency with spatial mappings which meet the self-consistency criterion.

2. The computer system of claim 1, wherein the processor unit is operable such that modifying an inconsistent spatial mapping comprises replacing the inconsistent spatial mappings with a replacement spatial mapping determined from spatial mappings which meet the self-consistency criterion.

3. The computer system of claim 2, wherein the processor unit is operable such that the replacement spatial mapping is based on an average of the spatial mappings which meet the self-consistency criterion.

4. The computer system of claim 1, wherein the processor unit is operable such that a parameter derived from each transformation matrix representing the respective spatial mappings is used in determining which spatial mappings meet the self-consistency criterion.

5. The computer system of claim 1, wherein the processor unit is operable such that a parameter derived from respective pairs of transformation matrices representing the respective spatial mappings is used in determining which spatial mappings meet the self-consistency criterion.

6. The computer system of claim 1, wherein the processor unit is operable such that the spatial mappings which meet the self-consistency criterion are determined based on a cluster analysis for the spatial mappings.

7. The computer system of claim 6, wherein the cluster analysis is based on deriving a similarity measure between respective pairs of spatial mappings.

8. The computer system of claim 7, wherein the similarity measure is based on a logarithm function applied to matrices representing the spatial mappings of the respective pairs of spatial mappings.

9. The computer system of claim 8, wherein the logarithm function comprises determining a logarithm of a product of a first matrix representing a first spatial mapping of a pair of spatial mappings and the inverse of a second matrix representing a second spatial mapping of the pair of spatial mappings.

10. The computer system of claim 9, wherein the similarity measure is based on a norm of the logarithm of the product of the first matrix and the inverse of the second matrix for each of the respective pairs.

11. The computer system of claim 1, wherein the processor unit is operable such that the spatial mappings which meet a self-consistency criterion are determined based on a statistical subset selection analysis.

12. The computer system of claim 1, wherein the processor unit is operable such that the process of identifying the set of the plurality of spatial mappings which meet a self-consistency criterion takes account of a confidence measure for the respective spatial mappings.

13. The computer system of claim 12, wherein the processor unit is operable such that the confidence measure is based on a degree of correspondence between the respective elements of the first and second medical images.

14. The computer system of claim 1, wherein the processor unit is operable such that the consistency constraint is applied by determining the spatial mappings from each element in the first medical image and a corresponding element in the second medical image using a particle swarm optimization (PSO) technique employing parallel local swarms for determining the respective spatial mappings.

15. The computer system of claim 14, wherein the processor unit is operable such that when determining the spatial mapping for an element in the first medical image, the respective local swarms are biased in search space by one or more of the members selected from the group comprising: (i) locations associated with optimum values for a degree of correspondence between the element in the first medical image and previously considered corresponding elements in the second medical image; and (ii) locations associated with optimum values for a degree of correspondence between a neighboring element in the first medical image and previously considered corresponding elements in the second medical image for the neighboring element as determined by the corresponding neighboring local swarms.

16. The computer system of claim 1, wherein the processor unit is operable such that the method further comprises identifying an initial plurality of initial elements in the first medical image and determining an initial spatial mapping from each initial element in the first medical image to a corresponding initial element in the second medical image to provide an initial plurality of initial spatial mappings, and wherein step (b) comprises determining the spatial mapping from each element in the first medical image to the corresponding element in the second medical image by taking account of the initial plurality of initial spatial mappings.

17. The computer system of claim 16, wherein the processor unit is operable such that the initial spatial mappings are also subject to a consistency constraint.

18. The computer system of claim 1, wherein the processor unit is operable such that the plurality of elements in the first medical image are based on anatomical features represented in the first medical image.

19. The computer system of claim 1, wherein the processor unit is operable such that the plurality of elements in the first medical image are identified by dividing the first medical image into a plurality of geometric shapes.

20. The computer system of claim 1, wherein the processor unit is operable such that the respective spatial mappings comprise affine transformations.

21. The computer system of claim 1, wherein the processor unit is operable such that the first and second medical images comprises two-dimensional (2D) medical images.

22. The computer system of claim 1, wherein the processor unit is operable such that the first medical image comprises a whole-body atlas image.

23. A computer-implemented method for determining a registration mapping between a first medical image and a second medical image, the method comprising the steps of:
(a) identifying a plurality of elements in the first medical image;
(b) determining a spatial mapping from each element in the first medical image to a corresponding element in the second medical image to provide a plurality of spatial mappings, wherein the spatial mappings are subject to a consistency constraint;
(c) determining a registration mapping between the first medical image and the second medical image based on the plurality of spatial mappings from the respective elements of the first medical image to the corresponding elements of the second medical image; and
(d) providing output data representing the registration mapping,
wherein the consistency constraint is applied by identifying inconsistent spatial mappings which are outside a set of the plurality of spatial mappings which meet a self-consistency criterion and modifying the inconsistent spatial mappings for improved consistency with spatial mappings which meet the self-consistency criterion.

24. A non-transitory computer readable storage medium having a computer readable program bearing machine readable instructions stored thereon, which when executed, causes a computer to carry out the method of claim 23.

25. An image processing device including a non-transitory computer readable medium loaded with machine readable instructions, which when executed, causes the image processing device to carry out the method of claim 23.

* * * * *